United States Patent Office 3,583,066
Patented June 8, 1971

3,583,066

METHOD OF MAKING LAMINATED INTEGRATED MAGNETIC ELEMENTS

Michel Carbonel, Paris, France, assignor to CSF-Compagnie Generale de Telegraphie Sans Fil Filed July 15, 1968, Ser. No. 745,044
Claims priority, application France, July 17, 1967, 114,470
Int. Cl. H01f 7/06
U.S. Cl. 29—604 8 Claims

ABSTRACT OF THE DISCLOSURE

An integrated magnetic element comprises a laminate structure formed of magnetic foils in alternation with layers of another material; an aperture is provided in said structure: conductors extend on each side of said structure and, in the form of eyelets through, said aperture; an insulating material is inserted between the conductors, the eyelets, and the structure.

The present invention relates to a method of producing integrated magnetic elements.

It is an object of the invention to provide an integrated magnetic element of the laminated type and a method for manufacturing the same.

According to the invention, there is provided an integrated circuit element comprising in combination: a laminate structure and, in said laminate structure, magnetic foils and insulating layers in alternation, two magnetic foils forming the two other faces of said structure; on said outer faces, two layers of a insulating material, said structure having apertures; a conductor pattern comprising conductors, extending on said insulating material alternately with respect to said apertures; and eyelets in said apertures, said eyelets being insulated from said magnetic foils.

For a better understanding of the invention and to show how the same may be carried into effect, reference will be made to the drawings accompanying the ensuing description and in which.

Figure 1:
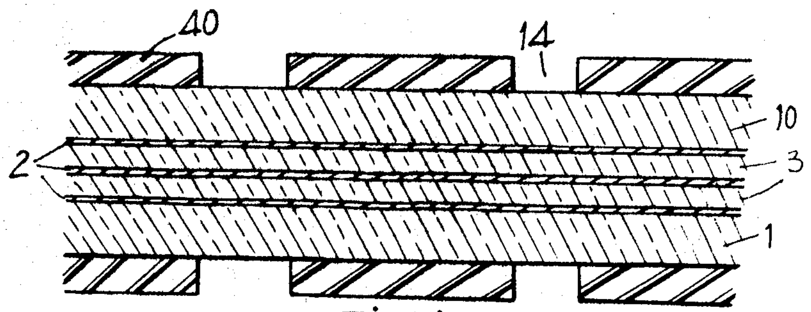
FIGS. 1 to 6 illustrate in section an element according to the invention during the various stages of its manufacture.

In FIG. 1 a copper foil or sheet 1, for example 20$\mu$ thick, is illustrated. Alternate layers of nickel-iron 2 (ranging, for example, between 0.5$\mu$ and a few $\mu$ in thickness) and copper 3 (for example 10$\mu$ thick), and a final layer of copper 10, for example, 20$\mu$ thick are deposited by electrolysis on the sheet 1. This produces a laminated sandwich structure.

Figure 2:
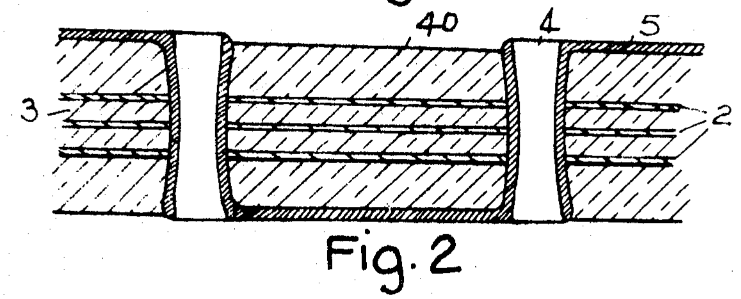

The sandwich structure is then covered with a layer 40 of photosensitive resin on both its external faces. In the layer 40, holes 14 are formed and then ducts 4 are formed in the sandwich at the same place (FIG. 2) by etching. Subsequently, the copper layers 1 and 10 are laid bare, where conductors 5 will be deposited by electroplating. These conductors are made of an etch-resistant material such as gold, silver etc. and cover the walls of ducts 4, forming eyelets in the sandwich. The arrangement has a thickness of between 10 and 20$\mu$, for example.

Figure 3:
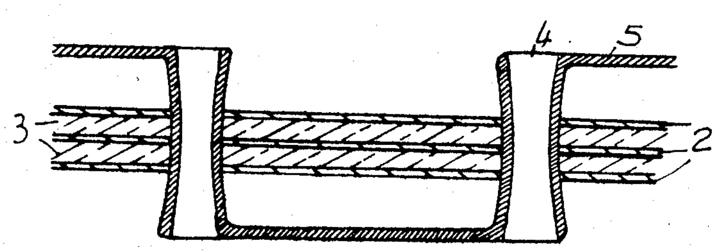

The resin which remains is then completely removed and then the copper of layers 1 and 10 on the two faces is dissolved away by an etching agent for example ammoniac, which does not attack the nickel-iron, the result being (FIG. 3) a thin foil of nickel-iron equipped with the connections held in position by the eyelets.

Figure 4:
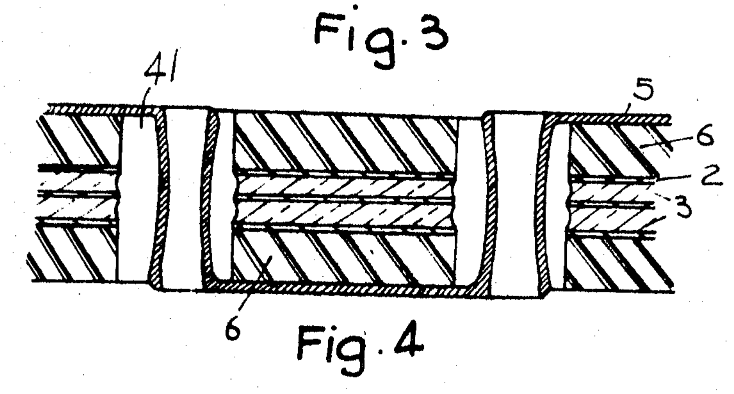

The whole of the arrangement is covered with a fresh photosensitive layer or resist 6, which penetrates, by capillary action, between the external magnetic foils 2 and the conductors 5. Using known photoengraving or photo-resist techniques, holes 41 are created through the resin and the ferromagnetic/copper laminate, the gold of the conductors 5 being unaffected. The result is shown in FIG. 4.

Finally, the whole arrangement is subjected for a protracted period to the action of an ammoniac etching agent, which dissolves only copper 3 of the laminate. Although this is a slow process, it is completed after some tens of hours.

Figure 5:
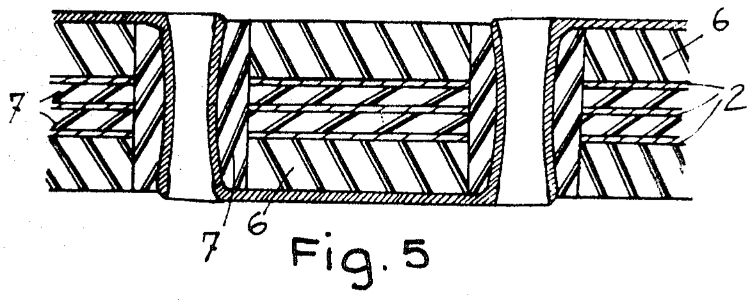

The result is a laminate structure composed exclusively of magnetic foils 2, the extremities of which are connected to the conductors by the layer of resin 6. The whole arrangement is ultimately filled with an insulating resin 7 which, by capillary action, insulates from one another the magnetic foils and prevents any contact between these foils and the transverse eyelets as shown in FIG. 5.

Figure 6:
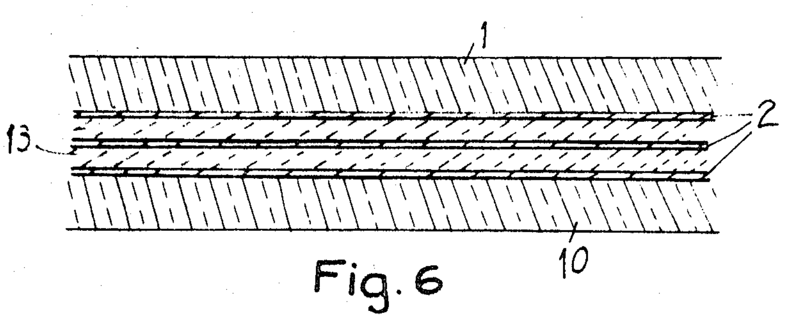

In another embodiment, the starting material is a foil of copper 1 (FIG. 6) on which are deposited, under vacuum, alternate layers of magnetic alloy 2 and a more or less porous mineral insulator 13, such as silicon monoxide, alumina, fluorite etc., the outer layers of the sandwich structure thus formed being of magnetic alloy. The other side of the assembly is then covered with another layer of copper 10. Thus a sandwich arrangement similar to that of FIG. 1 is obtained.

Figure 7:
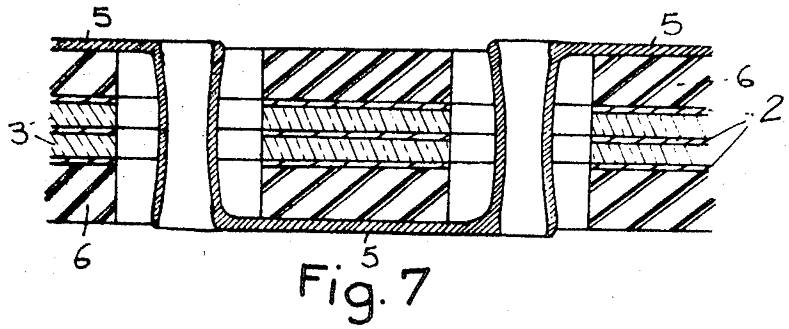
FIG. 7 illustrates in section an element according to the invention.
Figure 8:
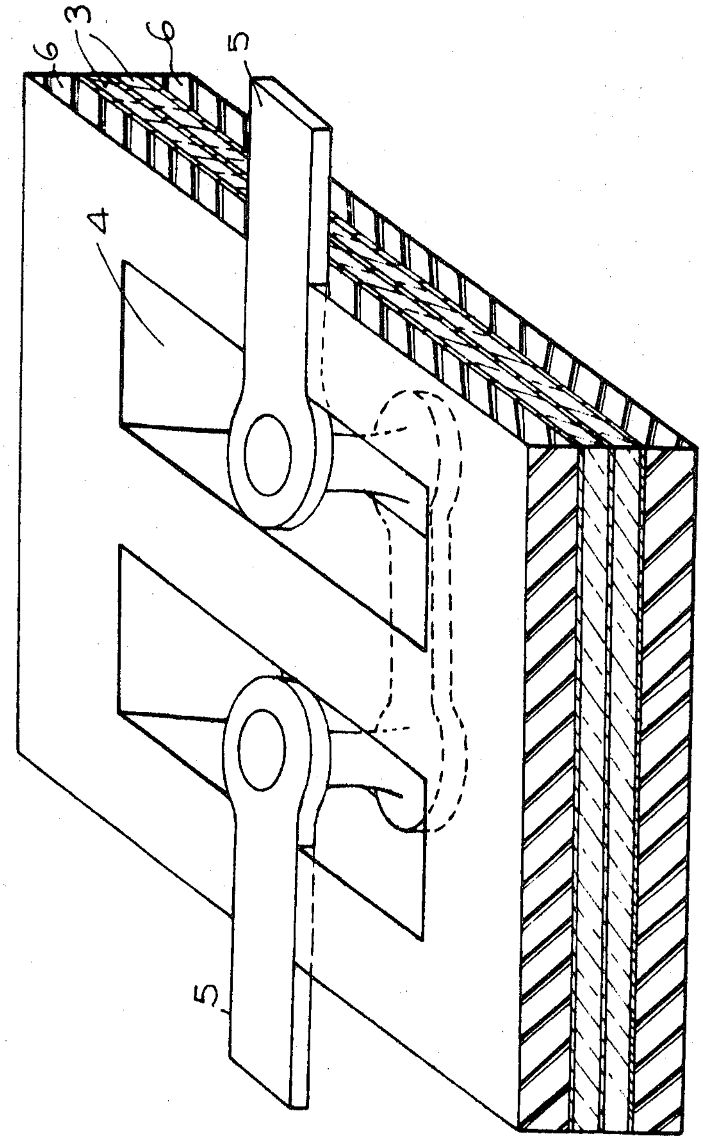
FIG. 8 shows an element according to the invention in perspective.

The assembly is then processed in the same way as described hereinbefore, until the arrangement shown in FIG. 7, is obtained, the insulating resin 6 being introduced by capillary action between the laminate and the conductors.

Finally, after rinsing, the whole arrangement may be encapsulated in a plastic coating as a protection against any moisture, which may have been absorbed by the mineral insulator remaining in the laminate.

The laminated assembly may contain only one ferromagnetic layer.

Of course the invention is not limited to the embodiments described and shown which were given solely by way of example.

What is claimed is:

1. A method of producing an integrated circuit element comprising the following steps: forming a laminated structure, with alternate layers of a ferromagnetic material and of another material, thus forming a sandwich, two layers of said ferromagnetic material forming the two outer faces of said sandwich; depositing respective layers of a conductive material on said outer faces; forming holes in said structure: forming by electroplating onto said conductive material, a conductive pattern comprising conductors; having portions extending between said holes alternately on one of said layers and on the other, said portions being connected by further portions extending through said holes; forming apertures in said assembly surrounding said further portions, removing said conductive material, and inserting insulating material, between said structure and said conductors, where said conductive material is removed.

2. A method as claimed in claim 1, wherein said step of forming said holes comprises the step of depositing a resin on said outer layers; forming holes in said resin by photoengraving, thus laying bare the corresponding portion of said conductive material, and etching said portion throughout said structure.

3. A method as claimed in claim 1, wherein said step of forming said conductive pattern comprises the step of laying bare, by photoengraving said resin, conductive material along a predetermined pattern; and electroplating said bare conductive material and said holes.

4. A method as claimed in claim 2, wherein said conductive material is copper.

5. A method as claimed in claim 4, wherein said other material is copper.

6. A method as calimed in claim 1, wherein the steps of forming said apertures comprises the step of filling said structure with a photosensitive resin level with said conductors, photoengraving the location of said apertures and etching.

7. A method as claimed in claim 1, wherein said other material is a porous mineral.

8. A method as claimed in claim 7 further comprising the step of encapsulating the assembly in a suitable plastic material.

References Cited

UNITED STATES PATENTS

| | | | |
|---|---|---|---|
| 2,942,240 | 6/1960 | Rajchman et al. | 340—174 |
| 3,407,492 | 10/1968 | Davis | 29—604 |
| 3,429,038 | 2/1969 | Dugan et al. | 29—625 |

JOHN F. CAMPBELL, Primary Examiner

C. E. HALL, Assistant Examiner

U.S. Cl. X.R.

29—625; 174—68.5; 340—174